(12) United States Patent  
Mohammad et al.

(10) Patent No.: US 11,677,660 B2  
(45) Date of Patent: Jun. 13, 2023

(54) FALLBACK SERVICE THROUGH A CLOUD EXCHANGE FOR NETWORK SERVICE PROVIDER CONNECTIONS

(71) Applicant: Equinix, Inc., Redwood City, CA (US)

(72) Inventors: Arifulla Baig Mohammad, Mountain House, CA (US); Sudhanva Gnaneshwar, Livermore, CA (US); Rajah Kalipatnapu, San Jose, CA (US)

(73) Assignee: EQUINIX, INC., Redwood City, CA (US)

( * ) Notice: Subject to any disclaimer, the term of this patent is extended or adjusted under 35 U.S.C. 154(b) by 54 days.

(21) Appl. No.: 17/302,368

(22) Filed: Apr. 30, 2021

(65) Prior Publication Data

US 2022/0353177 A1 Nov. 3, 2022

(51) Int. Cl.
*H04L 45/28* (2022.01)
*H04L 41/0816* (2022.01)
*H04L 41/5051* (2022.01)
*H04L 45/745* (2022.01)
*H04L 67/1034* (2022.01)

(52) U.S. Cl.
CPC .......... *H04L 45/28* (2013.01); *H04L 41/0816* (2013.01); *H04L 41/5051* (2013.01); *H04L 45/745* (2013.01); *H04L 67/1034* (2013.01)

(58) Field of Classification Search
CPC ... H04L 45/28; H04L 45/745; H04L 41/0816; H04L 41/5051; H04L 67/1034
See application file for complete search history.

(56) References Cited

U.S. PATENT DOCUMENTS

| | | | |
|---|---|---|---|
| 9,886,267 B2 | 2/2018 | Maheshwari et al. | |
| 9,948,552 B2 | 4/2018 | Teng et al. | |
| 10,129,078 B2 | 11/2018 | Kumar et al. | |
| 11,470,157 B2 * | 10/2022 | Lawson | G06F 21/64 |

(Continued)

OTHER PUBLICATIONS

International Search Report and Written Opinion of International Application No. PCT/US2021/061476, dated Mar. 23, 2022, 12 pp.

(Continued)

*Primary Examiner* — Brian Whipple
(74) *Attorney, Agent, or Firm* — Shumaker & Sieffert, P.A.

(57) ABSTRACT

An example method includes receiving, from a customer system by a cloud exchange comprising processing circuitry, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange; configuring, by the cloud exchange, a network route for a network gateway to the virtual gateway, the network gateway communicatively coupled to the public network; and providing, by the cloud exchange to the network gateway, routing information including the public IP address of the customer system to create a second connection communicatively coupling the customer system and the public network.

20 Claims, 13 Drawing Sheets

(56) References Cited

U.S. PATENT DOCUMENTS

| | | | |
|---|---|---|---|
| 2014/0047081 A1* | 2/2014 | Edwards | H04L 61/5014 709/220 |
| 2016/0088092 A1* | 3/2016 | Cardona-Gonzalez | H04L 67/10 709/227 |
| 2016/0308762 A1* | 10/2016 | Teng | H04L 41/5096 |
| 2021/0359948 A1* | 11/2021 | Durrani | H04L 47/20 |

OTHER PUBLICATIONS

U.S. Appl. No. 63/025,352, filed May 15, 2020, naming Durrani et al.

U.S. Appl. No. 17/019,001, filed Sep. 11, 2020, naming Kempf et al.

* cited by examiner

API CONTRACT – CREATE VIRTUAL GATEWAY ⬅ 702

| YAML | JSON |
|---|---|
| type: VG<br>name: Equinix Virtual Gateway<br>config:<br>  bandwidth: 50<br>  location:<br>    metro: xx<br>account:<br>  number: 1234<br>  name: Equinix Metal | {<br> "type": "VG",<br> "name": "Equinix Virtual Gateway",<br> "config": {<br>  "bandwidth": 50,<br>  "location": {<br>   "metro": "xx"<br>  }<br> },<br> "account": {<br>  "number": 1234,<br>  "name": "Equinix Metal"<br> }<br>} |

FIG. 7A

API CONTRACT – CREATE CONNECTION FROM VIRTUAL GATEWAY TO NETWORK GATEWAY

─704

| YAML | JSON |
|---|---|
| type: VG_VC<br>name: VG-IGW-Connection<br>config:<br>  bandwidth: 50<br>  accessPoints:<br>    - type: IGW<br>      config:<br>        port:<br>          uuid: 20d32a80-0d61-4333-bc03-707b591ae2f4<br>  linkProtocol:<br>    - type: TYPE5VNI<br>      config:<br>        type5Vni: 999<br>  routingProtocol:<br>    - type: IBGP<br>      config:<br>        vendorAsn: 10101<br>  nat:<br>    - type: STATIC_MAPPING<br>      config:<br>        ipv4:<br>          rules:<br>            - seqId: 123<br>              publicIp: 5.5.5.0<br>              privateIp: 10.1.1.2 | {<br> "type": "VG_VC",<br> "name": "VG-IGW-Connection",<br> "config": {<br>  "bandwidth": 50,<br>  "accessPoints": [<br>   {<br>    "type": "IGW",<br>    "config": {<br>     "port": {<br>      "uuid": "20d32a80-0d61-4333-bc03-707b591ae2f4"<br>     }<br>    }<br>   }<br>  ],<br>  "linkProtocol": {<br>   "type": "TYPE5VNI",<br>   "config": {<br>    "type5Vni": 945<br>   }<br>  },<br>  "routingProtocol": {<br>   "type": "IBGP",<br>   "config": {<br>    "vendorAsn": 10101<br>   }<br>  },<br>  "nat": {<br>   "type": "STATIC_MAPPING",<br>   "config": {<br>    "ipv4": {<br>     "rules": [<br>      {<br>       "seqId": 123,<br>       "publicIp": "5.5.5.0",<br>       "privateIp": "10.1.1.2"<br>      }<br>     ]<br>    }<br>   }<br>  }<br> }<br>} |

FIG. 7B

FALLBACK SERVICE THROUGH A CLOUD EXCHANGE FOR NETWORK SERVICE PROVIDER CONNECTIONS

TECHNICAL FIELD

The disclosure relates to computer networks and, more specifically, to fallback services for computer networks.

BACKGROUND

Many enterprises rely on having network communication capability over public networks such as the Internet. As an example, corporations may rely on network communications to provide information about products and services, receive orders for products or services, provide access to cloud services or other services, operate virtual private networks to connect different sites, provide customer service, and to control aspects of corporate operations. A failure in network communication, even for a brief period of time, can lead to lost revenue, customer dissatisfaction, and/or disruption in corporate operations.

SUMMARY

In general, this disclosure describes techniques a cloud exchange-based fallback service for a service provided by a network service provider. In a normal operations mode, an enterprise may communicate network traffic with a public network, such as the Internet, via a network service provider. In the event that the network service provider becomes unavailable to communicate network traffic between the enterprise and the public network, the enterprise can utilize cloud exchange-based access to the public network as a fallback service. For example, the enterprise can issue application program interface (API) calls to create a virtual gateway on a network device of the cloud exchange, which is separate from the network service provider and operated by a different entity. The API calls can provide an interface for the enterprise to supply routing information such as Autonomous System Numbers (ASNs), public IP addresses and other routing information to the cloud exchange provider for use in configuring the virtual gateway and advertising the cloud exchange as offering reachability to the enterprise. The virtual gateway can establish a network connection to the public network for use by the enterprise.

The aspects described above, and further aspects described herein may provide one or more technical advantages that present at least one practical application. For example, the virtual gateway can be established on-demand in the event of a network service outage related to the network service provider, thereby minimizing the impact of the service outage on the enterprise. As another example, the enterprise can benefit from having a fallback service available to it without the need for a dedicated secondary connection to the public network. This can lower the operational costs associated with maintaining network services for the enterprise. Further, traditional methods of modifying network infrastructure in a cloud exchange, whether the infrastructure is virtual of physical, typically require advance notice to, and the involvement of administrators of the cloud exchange provider. Using the techniques described herein, a virtual gateway can be established rapidly on-demand by the customer without the involvement of an administrator of the cloud exchange provider. As a still further example, because an enterprise customer of the cloud exchange typically already has dedicated connectivity into the cloud exchange fabric—and typically at the network edge, the fallback service described herein may allow the enterprise to quickly leverage that existing connectivity and customer relationship for an on-demand, resilient, and low-latency fallback service.

In some examples, a method includes receiving, from a customer system by a cloud exchange comprising processing circuitry, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange; configuring, by the cloud exchange, a network route for a network gateway to the virtual gateway, the network gateway communicatively coupled to the public network; and providing, by the cloud exchange to the network gateway, routing information including the public IP address of the customer system to create a second connection communicatively coupling the customer system and the public network.

In some examples, a cloud exchange includes a memory; and processing circuitry configured to: receive, from a customer system, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange; configure a network route for a network gateway to the virtual gateway, the network gateway communicatively coupled to the public network; and provide, to the network gateway, routing information including the public IP address of the customer system to create a second connection communicatively coupling the customer system and the public network.

In some examples, a computer-readable storage medium includes machine executable instructions that, when executed, cause processing circuitry to: receive, from a customer system, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange; configure a network route for a network gateway to the virtual gateway, the network gateway communicatively coupled to the public network; and provide, to the network gateway, routing information including the public IP address of the customer system to create a second connection communicatively coupling the customer system and the public network.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7B are block diagrams illustrating conceptual views of Application Programming Interface contracts, in accordance with one or more aspects of the techniques described in this disclosure.

Like reference characters denote like elements throughout the figures and text.

DETAILED DESCRIPTION

Figure 1A:
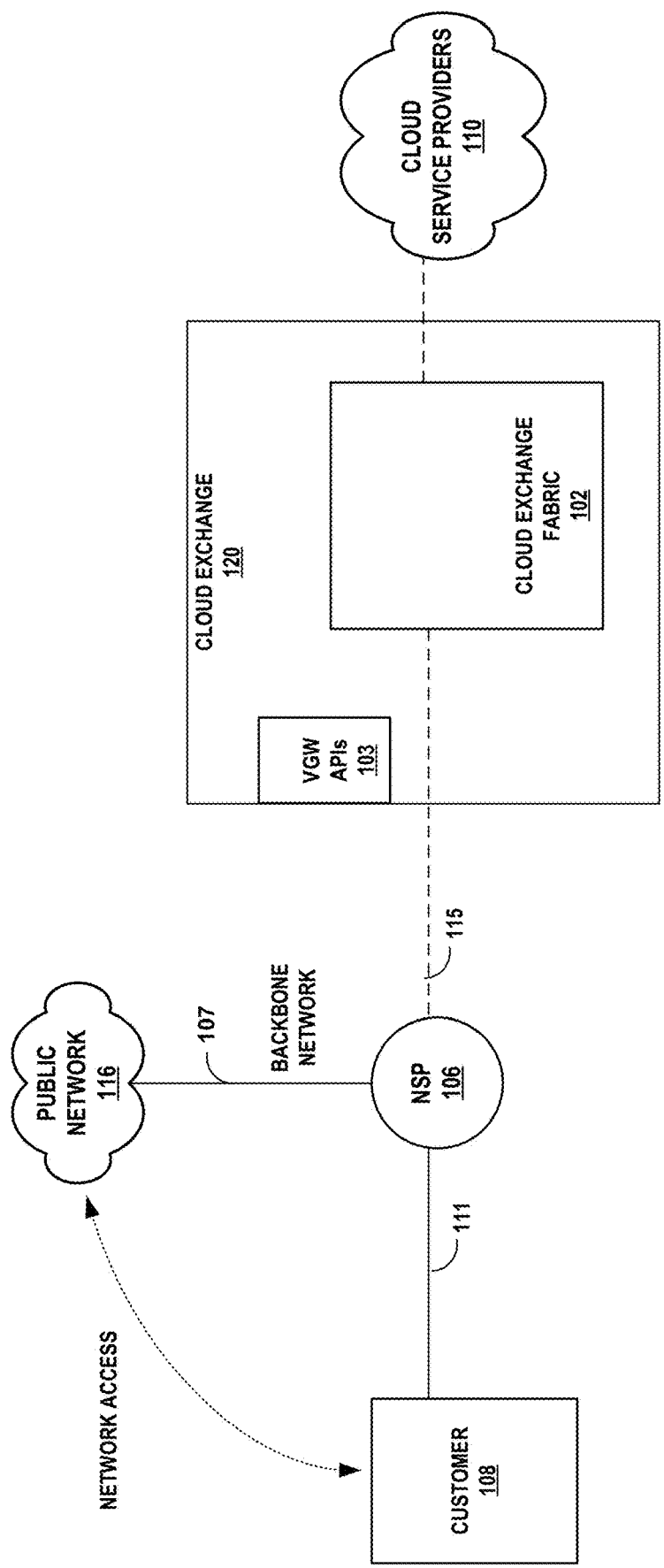
FIGS. 1A-1E are block diagrams that illustrate example systems providing fallback services for network service providers according to techniques described herein.

FIGS. 1A-1E are block diagrams that illustrate example systems providing fallback services for network service providers according to techniques described herein. In the examples discussed below, reference will be made to "colocated" and "non-colocated" customers. A colocated customer refers to a customer that has purchased, leased, or otherwise arranged for use of network and/or compute infrastructure operated by a third party provider such as a data center provider. A non-colocated customer refers to a customer that does not have current use of such network and/or compute infrastructure. A customer may be an enterprise, governmental unit, individual, or any other consumer of services provided by a network service provider.

The example systems discussed below can include a network service provider (NSP) 106, cloud exchange 120, network gateway 112, and cloud service providers 110. Examples of cloud service providers 110 include Google Cloud, Azure, Oracle Cloud, Amazon Web Services (AWS), IBM Cloud, Alibaba Cloud, and Salesforce. Cloud exchange 120 can provide a cloud exchange fabric 102 that communicatively couples colocated customers 108 with cloud service providers. In some aspects, cloud exchange fabric 102 can be an Equinix Fabric provided by Equinix Inc. of Redwood, Calif.

NSP 106 can provide network services for customer 108. For example, NSP 106 can include network infrastructure (routers, switches, gateways etc.) that can provide customer 108 with connectivity to public network 116. Public network 116 may be a network that is publicly available with few or no restrictions. For example, public network 116 may be a network that is part of the Internet. Network gateway 112 can also include network infrastructure to provide connectivity to public network 116. In some aspects, network gateway 116 may be part of the Equinix Connect platform provided by Equinix Inc.

Figure 1B:
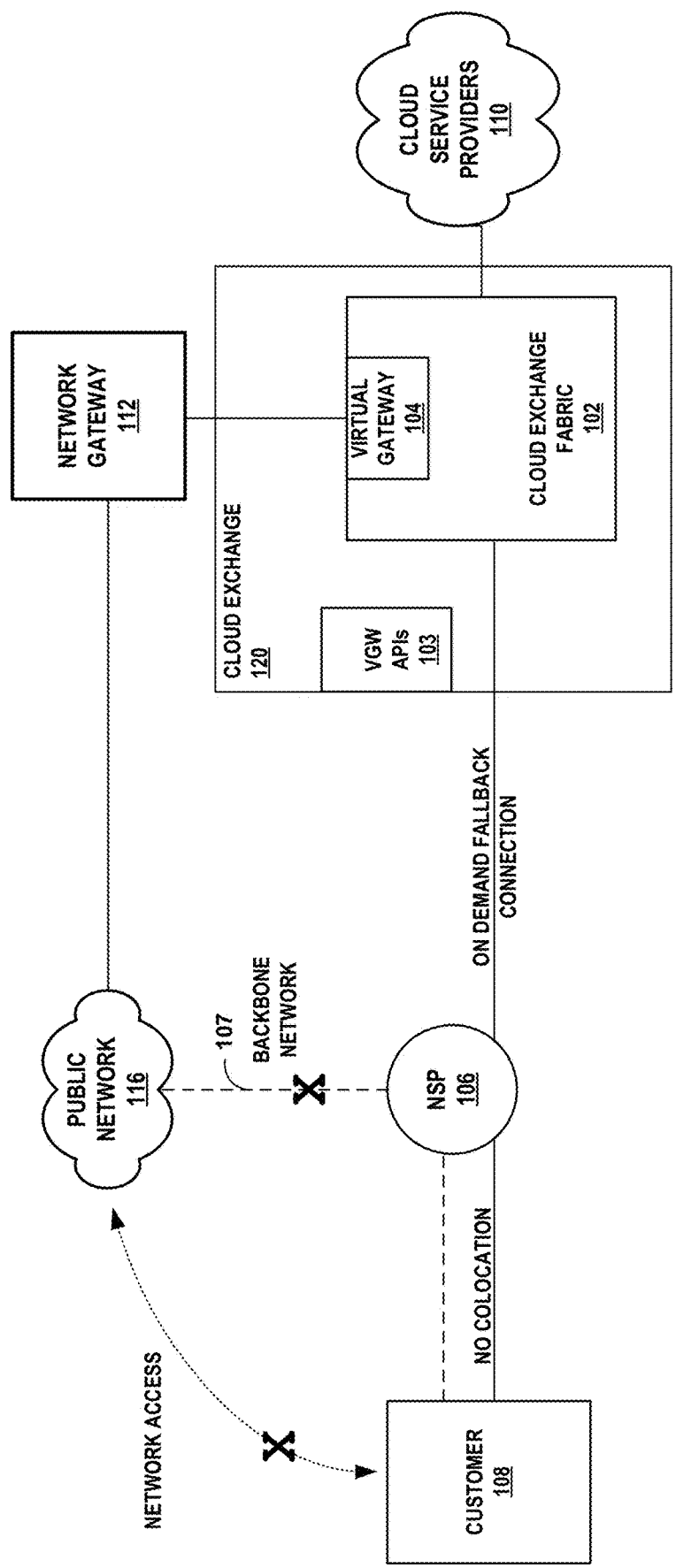
Figure 1C:
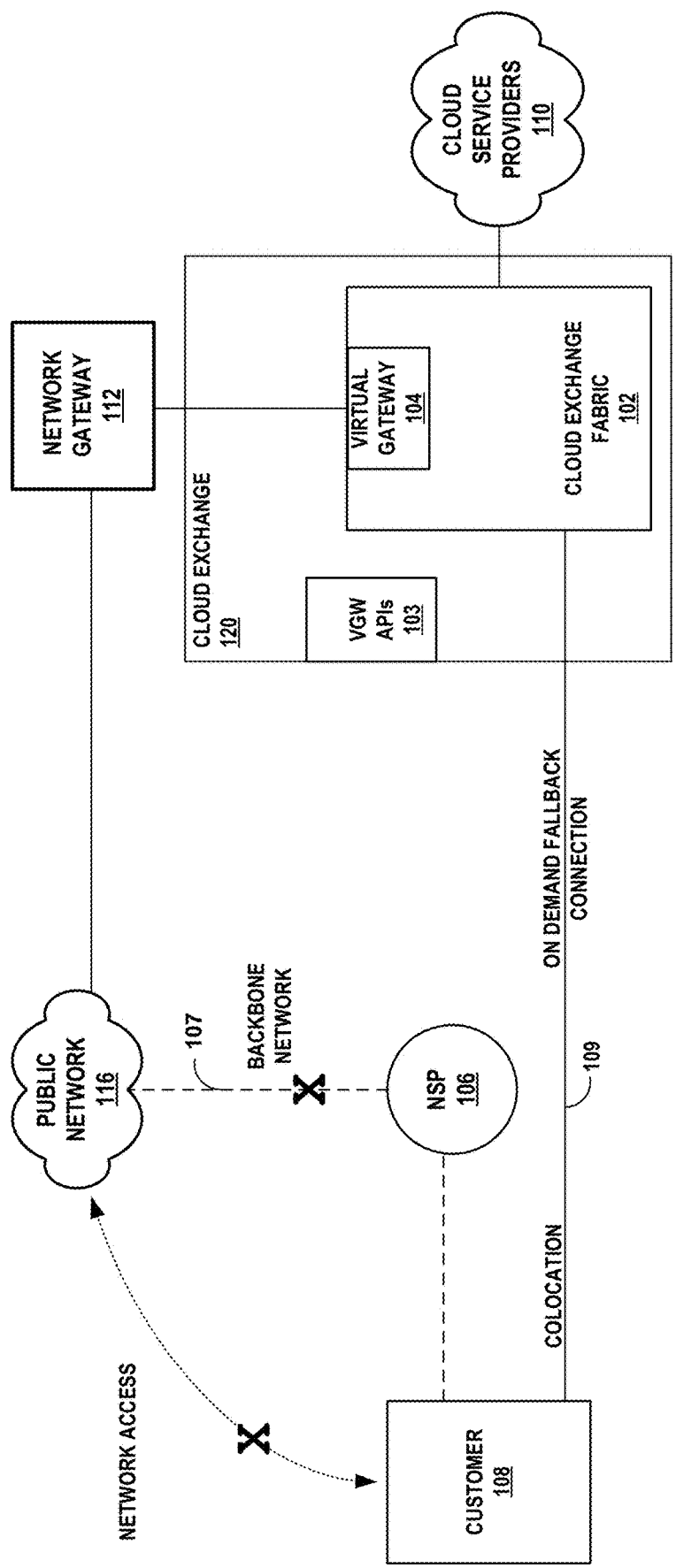
Figure 1D:
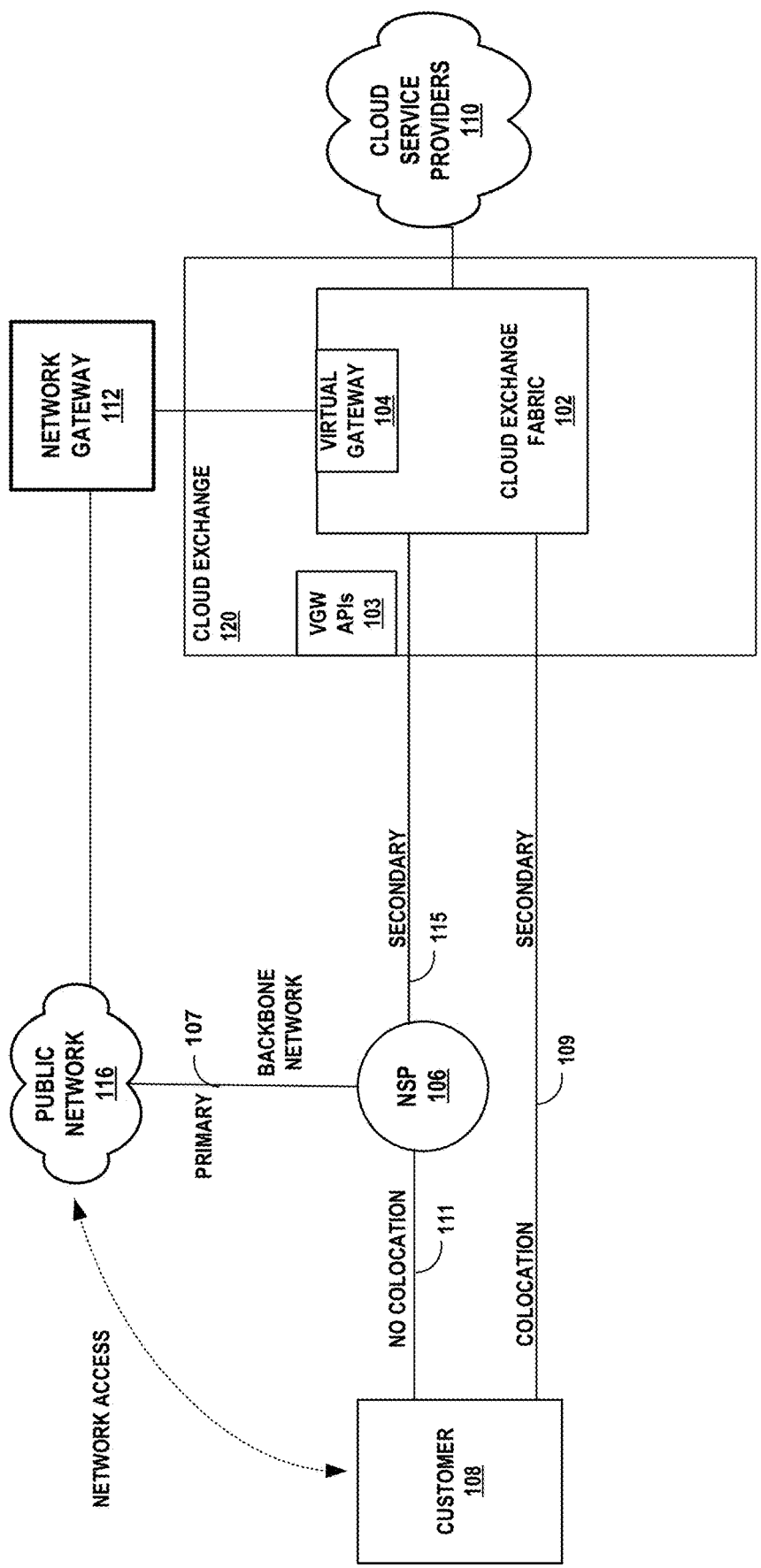
Figure 1E:
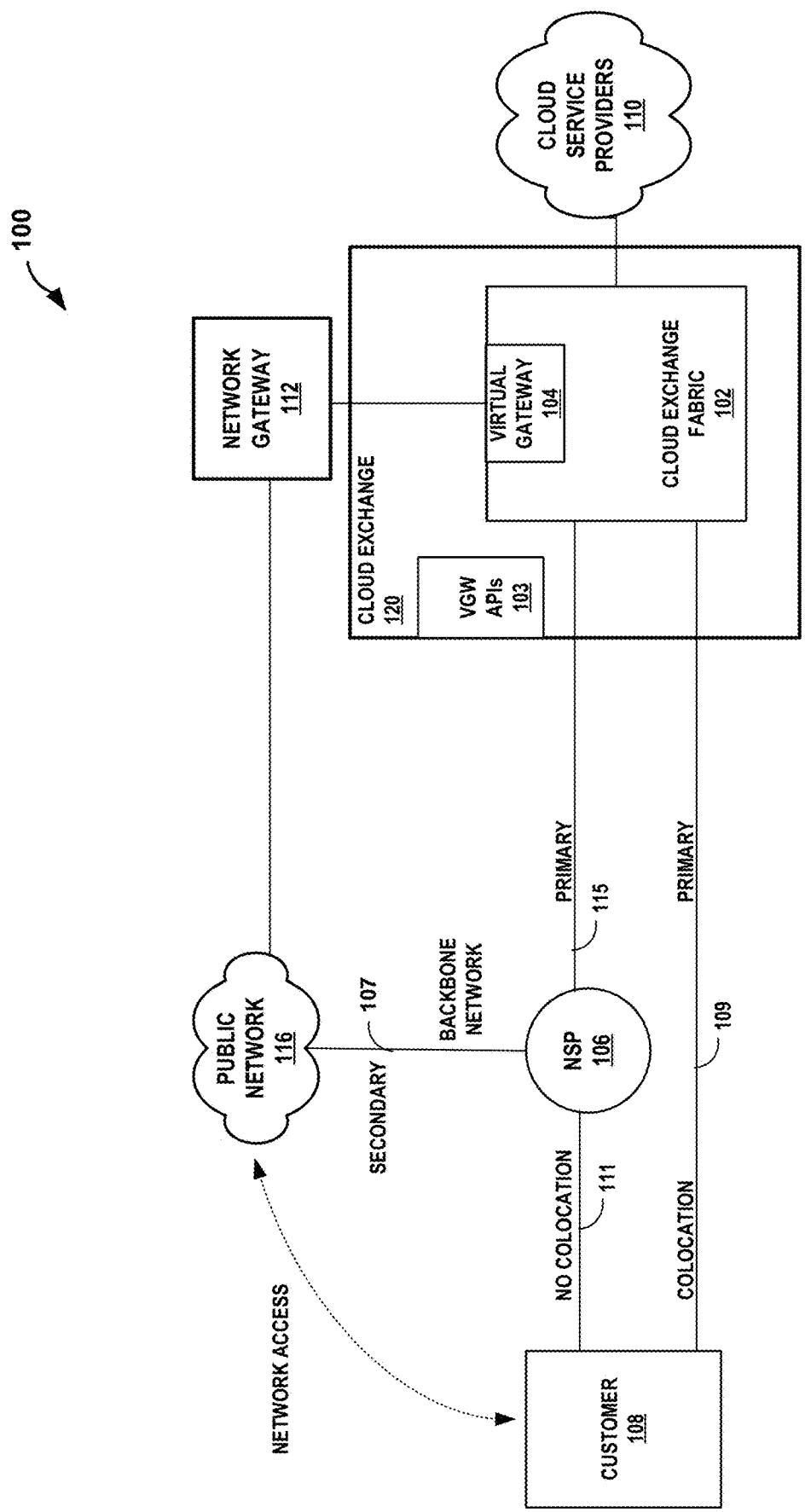

FIGS. 1A-1C illustrate on-demand requests for fallback services. FIGS. 1D and 1E illustrate redundant connections providing fallback services. In FIGS. 1A-1E discussed below, a line between elements indicates that the elements are communicatively coupled with one another via a communications path. A solid line indicates that the communications path is available, operational, and in use by the indicated customer. A dashed line indicates that the communications path is available and operational, but not in use by the indicated customer. A line with an "X" marked across the line indicates that the marked path has failed in some way and that communications no longer can take place over the marked path.

FIG. 1A is a block diagram illustrating initial communication links in a system 100 providing fallback services to a non-colocated customer 108. In the example illustrated in FIG. 1A, customer 108 is a non-colocated customer. Customer 108 accesses a public network 116 via communication link 111 and backbone network 107 via NSP 106. In some aspects, public network 116 may be the Internet, and backbone network 107 may be a backbone network that is part of the Internet. In this example, backbone network 107 between NSP 106 and public network 116 is operational and provides a communication path between non-colocated customer 108 and public internet 116.

Communication link 115 between NSP 106 and cloud exchange fabric 102 may be operational, but is unused by customer 108 in the example system state illustrated in FIG. 1A. Cloud exchange fabric 102 may also have a communication link with one or more cloud service providers.

Virtual gateway Application Program Interfaces (APIs) 103 provide software interfaces to cloud exchange provider 120 systems that can be used to control the creation, modification, and deletion of virtual gateways on cloud exchange provider 120 systems. FIGS. 7A-7B provide details on example API contracts that may be provided in some implementations, and will be discussed in further detail below.

FIG. 1B is a block diagram illustrating communication links in system 100 where backbone network 107 is no longer operational for a non-colocated customer. As a result, non-colocated customer 108 can no longer access public network 116 via backbone network 107. Non-colocated customer 108 or cloud exchange provider 120 may detect that access to network 116 is no longer available. In some aspects, non-colocated customer 108 can issue a request to cloud exchange provider 120 via APIs 103 to establish a network connection path to public network 116. In some aspects, non-colocated customer 108 may arrange, using virtual gateway APIs 103, for cloud service provider 120 to monitor error traps from customer 108 that indicate a network connectivity issue between customer 108 and public network 116. For example, cloud provider 120 may monitor Simple Network Protocol (SNMP) traps associated with customer 108's network connection to public network 116 via network service provider 106.

In response to customer 108 or cloud exchange provider 120 detecting a network service outage, cloud exchange provider 120 can create a virtual gateway 104 for use by non-colocated customer 108. Various details of virtual gateway 104 are described in U.S. Provisional Patent Application Ser. No. 63/025,352, filed May 15, 2020 and entitled, "BANDWIDTH AGGREGATION SERVICE MODEL USING VIRTUAL GATEWAYS IN A CLOUD EXCHANGE," which is incorporated herein by reference. Cloud exchange provider 120 can use configuration parameters provided by customer 108 via APIs 103 to configure virtual gateway 104 to route network traffic from non-colocated customer 108 to network gateway 112, which has a communications link to public network 116. Thus, network traffic for non-colocated customer 108 to or from public network 116 is routed through NSP 106, cloud exchange fabric 102, virtual gateway 104 and network gateway 112. This communication path may be referred to as an "on-demand" communication path because it is created upon the request of non-colocated customer 108 as needed, and may not exist when not needed (i.e., when the communication path via backbone network 107 is operational).

FIG. 1C is a block diagram illustrating communications links in system 100 where backbone network 107 is no longer operational for a colocated customer. In this example, customer 108 has previously arranged for communications services to be provided by both NSP 106 and cloud exchange provider 120. During ordinary operation, customer 108 may communicate with public network 116 via NSP 106 and backbone network 107. In the case that backbone network 107 is no longer operational or available, customer 108 may issue a request to cloud exchange provider 120 to establish a network connection path to public network 116. Cloud exchange provider 120 can create a virtual gateway 104 for use by colocated customer 108. Cloud exchange provider 120 can configure virtual gateway 104 to route network traffic from non-colocated customer 108 to network gateway 112 via the link 109 between customer 108 and cloud exchange fabric 102. Thus, in this example, network traffic for colocated customer 108 to or from public network 116 is routed through cloud exchange fabric 102, virtual gateway 104 and network gateway 112. As with the example illustrated in FIG. 1B, this communication path may be referred to as an "on-demand" communication path because it is created upon the request of customer 108 as needed, and may not exist when not needed (i.e., when the communication path via backbone network 107 is operational).

FIG. 1D illustrates a state of system 100 in which a customer 108 is configured with redundant communications paths to public network 116. The example illustrated in FIG. 1D will be used to describe a redundant communication path for both a colocated and a non-colocated customer 108. A non-colocated customer 108 can utilize communication link 111 and communication link 107 as a primary connection to communicate with public network 116 via NSP 106. Additionally, a non-colocated customer 108 can utilize communication link 111 and communication link 115 as a secondary connection to communicate with public network 116 via cloud exchange fabric 102, virtual gateway 104 and network gateway 112.

In the example illustrated in FIG. 1D, the primary connection for a colocated customer 108 is the same as for a non-colocated customer 108. That is, the primary connection for colocated or non-colocated customer 108 can be via communication link 111 and communication link 107. A colocated customer 108 can use a direct connection 109 as a secondary connection to reach public network 116 via cloud exchange fabric 102, virtual gateway 104, and network gateway 112.

FIG. 1E illustrates an alternative state of system 100 in which a customer 108 is configured with redundant communications paths to public network 116. As in FIG. 1D, the example illustrated in FIG. 1E will be used to describe a redundant communication path for both a colocated and a non-colocated customer 108. In the example illustrated in FIG. 1E, the primary and secondary communication links are swapped when compared to the example illustrated in FIG. 1D. Thus, a non-colocated customer 108 can utilize communication link 111 and communication link 115 as a primary connection to communicate with public network 116 via cloud exchange fabric 102, virtual gateway 104 and network gateway 112. Non-colocated customer 108 can utilize communication link 111 and communication link 107 as a secondary connection to communicate with public network 116.

A colocated customer 108 can use a direct connection 109 as a primary connection to reach public network 116 via cloud exchange fabric 102, virtual gateway 104, and network gateway 112. In the example illustrated in FIG. 1E, the secondary connection for a colocated customer 108 is the same as for a non-colocated customer 108. That is, the secondary connection for colocated customer 108 can be via communication link 111 and communication link 107.

Figure 2A:
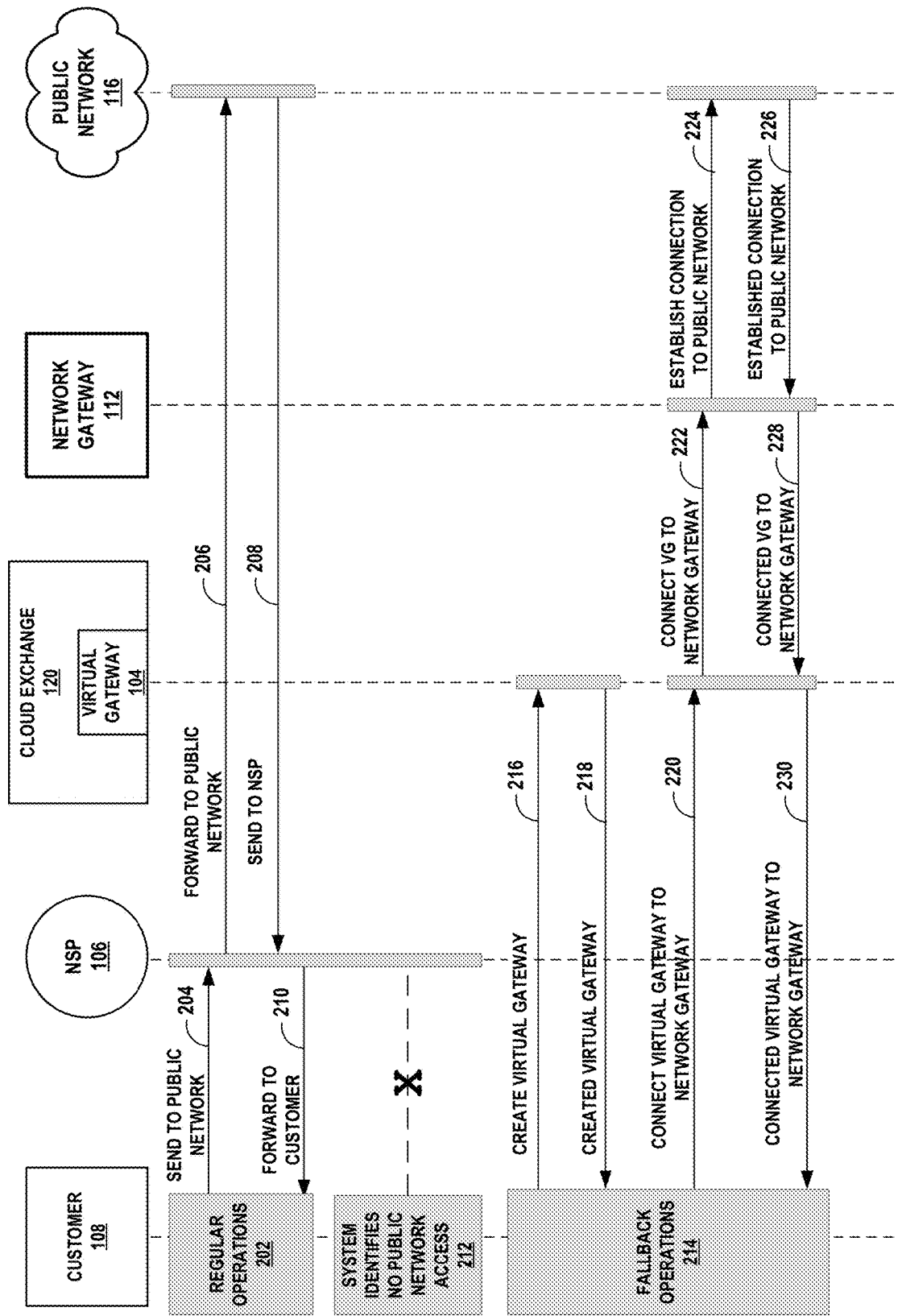
FIGS. 2A and 2B are sequence diagrams illustrating example operations for providing fallback services for network service providers according to techniques described herein.
Figure 2B:
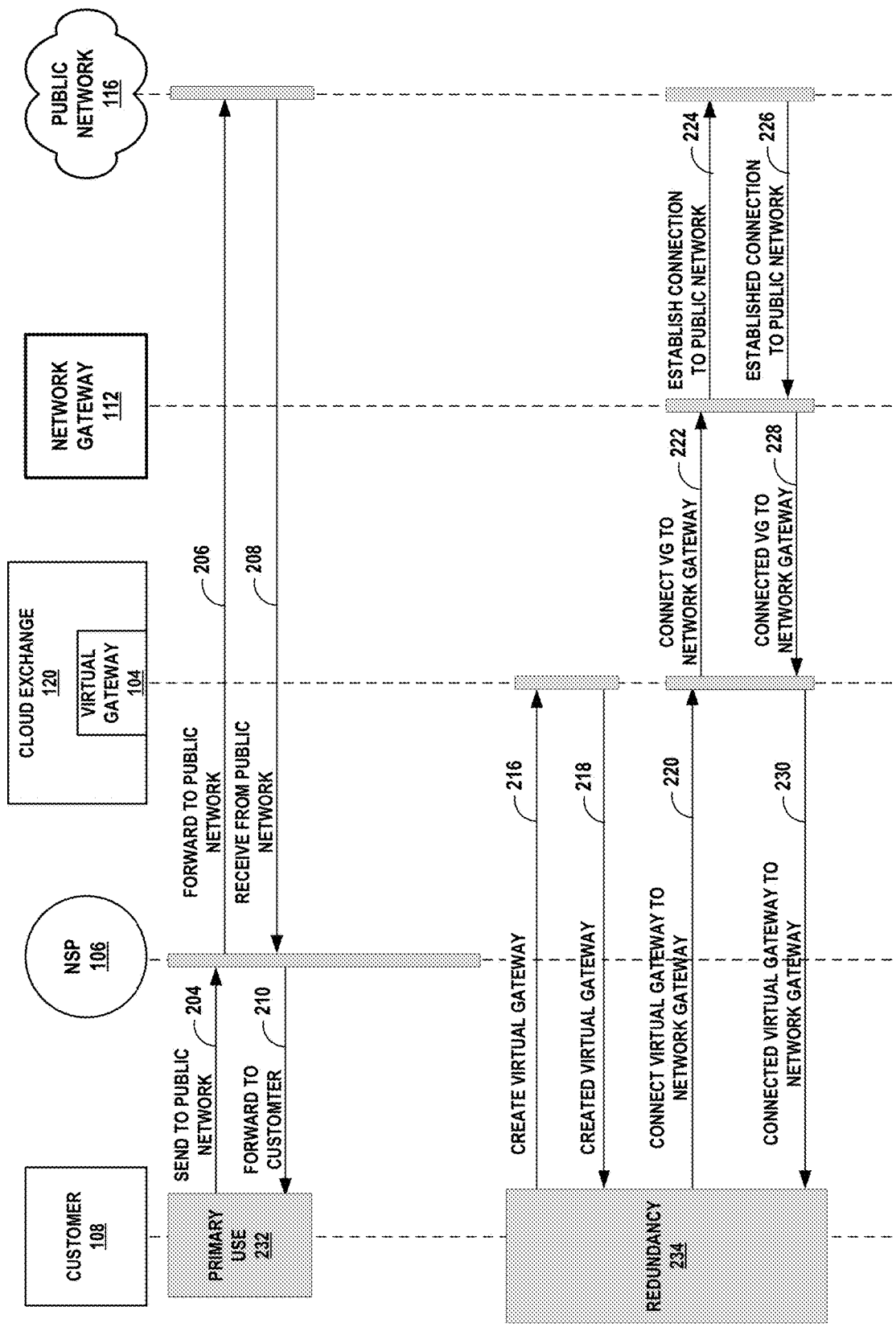

FIGS. 2A and 2B are sequence diagrams illustrating example operations for providing fallback services for network service providers according to techniques described herein. During regular operations period 202, customer 108 accesses public network 116 via NSP 106.

FIG. 2A is a sequence diagram illustrating example operations for providing fallback services for network service providers according to techniques described herein. During regular operations 202, customer 108 sends network traffic destined for public network 116 to NSP 106 (204). NSP 106 forwards the network traffic to public network 116 via, for example, a backhaul network (206). Routers on public network 116 send network traffic that is destined for customer 108 is sent to NSP 116 (208). NSP 116 then forwards the network traffic from public network 116 to customer 108 (210).

Customer 108, at some point during regular operations, loses access to public network 116 (212). The loss of access to public network 116 may be detected by either customer 108 or cloud exchange 120. In some aspects, devices on customer 108's network can determine that customer 108 can no longer access public network 116. Various techniques may be used to determine that customer 108 no longer has access to public network 116. For example, one or more network devices on customer 108's network may generate an SNMP trap indicating loss of access to public network 116. Customer 108 may receive an indication of a network device hardware error. Customer 108 may determine that packet latency times have increased indicating a potential backbone network outage. Customer 108 may determine that no network traffic is being communicated between NSP 106 and customer 108, indicating a potential NSP 116 outage that prevents customer 108 from communicating with public network 116.

In some aspects, cloud exchange 120 may determine that a network outage affecting customer 108 has occurred. For example, cloud exchange 120 may receive SNMP trap information for customer 108 indicating customer 108 can no longer communicate to public network 116.

In response to determining that customer 108 no longer has access to public network 116, customer 108 and cloud exchange 108 initiate fallback operations 214. In some aspects, customer 108 sends a "create virtual gateway" request to cloud exchange 120 (216). The request can include parameters that specify configuration details for the virtual gateway 104 to be created by cloud exchange 120.

FIG. 7A illustrates a conceptual view of an example API contract data structure 702 for creating a virtual gateway that customer 108 can use to supply such parameters. The example API contract data structure 702 is shown in FIG. 7A in two formats, YAML Ain't Markup Language (YAML) and JavaScript Object Notation (JSON). In the example illustrated in FIG. 7A, the API contract data structure 702 includes a type parameter, a name parameter, a configuration parameter, and an account parameter. The type parameter defines the type of object ("VG" in this example). The name parameter provides a name for the virtual gateway to be created ("Equinix Virtual Gateway" in this example). The configuration parameter includes a bandwidth and location. The bandwidth parameter specifies the maximum bandwidth (e.g., rate, etc.), in that customer 108 would like the newly created virtual gateway 104 to be able to handle ("50 Gbps" in this example). The location parameter identifies a location of a cloud exchange where the virtual gateway is to be created. In this example, "metro" indicates a cloud exchange in a metropolitan area and the "xx" value is a two letter indicator of the metropolitan area (e.g., "SV" for Silicon Valley, "NY" for New York, "CH" for Chicago etc.). The account parameter includes an account number and an account name parameter. The account number parameter provides an account number associated with customer 108 that the cloud exchange 120 can use for billing, tracking etc. In some aspects, the account name parameter can be used to map the routing instance (RI) configuration for the identified customer account. This mapping can make it easier for a network administrator or network engineer to troubleshoot a problem associated with a customer's routing instances.

Returning to FIG. 2A, upon successful validation of the parameters in the "create virtual gateway" request, cloud exchange 120 creates virtual gateway 104 using the parameters. In some aspects, virtual gateway 104 can be created on a network device that is "close" to customer 108. That is, virtual gateway 104 can be created on a network device on cloud exchange fabric 102 that is close to customer 108 from a network topology standpoint. For example, customer 108 will have a network connection to a physical port on a network device on cloud exchange fabric 102. The network device can be referred to as the "primary network device." In some aspects, cloud exchange 120 will attempt to instantiate virtual gateway 104 on the primary device. Upon successful creation of virtual gateway 104, cloud exchange 120 issues a response to customer 108 indicating that virtual gateway 104 has been created.

In some cases, virtual gateway 104 may already exist prior to identification that customer 108 cannot access public network 116. For example, customer 108 may be a colocated customer and thus there may be a previously created virtual gateway for customer 108 in cloud exchange 120 that is being used to access one or more of cloud service providers 110. In this situation, customer 108 may use the previously created virtual gateway 104 to access public network 116. Additionally, in the case of a colocated customer 108, cloud exchange 120 may create a second virtual gateway on a network device ("secondary network device") having a port connected to one of cloud service providers 110 used by customer 108. In some aspects, this second virtual gateway is for internal use by cloud exchange 120 and may not be visible to customer 108. The second virtual gateway may be used as a failover device should the first virtual gateway fail. In some aspects, the second virtual gateway may be created as part of the create virtual gateway request. In some aspects, if the customer already has a virtual gateway in the same metro area, the create virtual gateway request can reuse the previously created gateway.

In some aspects, when a virtual gateway is created and provisioned in a metro area by a customer, the system creates RIs on all routing devices in that metro area. The RIs may be "auto-subscribed" to each other as a default case. The RIs share the same Virtual Routing and Forwarding (VRF) and import/export policies pertaining to route targets.

Fallback operations 214 further include customer 108 issuing a request to cloud exchange 120 to connect virtual gateway 104 to network gateway 112 (220). In some aspects, the request includes parameters that provide gateway protocol (e.g., Border Gateway Protocol (BGP) information that can be used by virtual gateway 104 to communicatively connect gateway 104 to public network 116.

FIG. 7B illustrates a conceptual view of an example API contract data structure 704 for connecting a virtual gateway to public network 116 that customer 108 can use to supply such parameters. As with FIG. 7A, the example API contract data structure 704 is shown in FIG. 7B in two formats, YAML and JSON. In the example illustrated in FIG. 7B, the API contract data structure 704 includes a type parameter, a name parameter, and a configuration parameter. The type parameter defines the type of object ("VG VC" in this example). The name parameter provides a name for the virtual gateway to be created ("VG-IGW-Connection" in this example).

The configuration parameter includes bandwidth, access points, link protocol, routing protocol and network address translation (NAT) parameters. The bandwidth parameter specifies the maximum bandwidth (e.g., rate, etc.) that customer 108 would like the connection to the virtual gateway 104 to be able to handle ("50" Gbps in this example).

The access points parameter includes a type and port fields. The type field indicates the type of connection the gateway 104 is to use to connect to public network 116. In this example, the type field is specified as "IGW" indicating that the virtual gateway is to be connected to an Internet gateway (e.g., network gateway 112). In some aspects, other types may be as follows:

COLO i.e. PORT—Another port in another location (same or different customer)
L2SP—Layer 2 Service Provider (AWS, AZURE, GCP, ORACLE CLOUD, IBM, etc.)
L3SP—Layer 3 Service Provider (SAP, SFDC, ORACLE, etc.)

The port field defines has a value that identifies a provisioned port. In some aspects, the port field is a Universally Unique Identifier (UUID). Customers can use fabric APIs to pull all the provisioned ports using a GET primitive. Each port in the response has its UUID & its properties in the response. Alternatively, a customer may lease port(s) from re-sellers like AT&T, Telstra.

The link protocol parameter defines the protocol to be used between virtual gateway 104 and network gateway 112. In some aspects, the link protocol parameter has two fields, type and config. In the example illustrated in FIG. 7A, the type field is "TYPE5VNI" indicating that a type-5 Ethernet Virtual Private Network with Virtual eXtensible Local Area Network (EVPN-VxLAN) link is to be used between virtual gateway 104 and network gateway 112. The config field has a value of "999" indicating the VxLAN identifier of the VxLAN.

The routing protocol parameter has two fields, type and vendor Autonomous System Number (ASN) indicating the customer peer ASN used to establish a BGP session. In this example, type is "IBGP" indicating that virtual gateway 104 desires to use Internal Border Gateway Protocol (IBGP) to advertise routing information regarding the virtual gateway. In this example, ASN is "10101."

The NAT parameter has a type field and a config field. The type field indicates the type of mapping for Internet Protocol (IP) addresses for the virtual gateway 104 and network gateway 116. In the example illustrated in FIG. 7B, the type field has a value of "STATIC_MAPPING" indicating that there is a one-to-one mapping between a private IP address and a public IP address exposed on public network 116. The presence of "ipv4" in the config field indicates that the network addresses in the configuration conform to an IP version 4 address. Further values specific to the "ipv4" parameter include a seqId value, a publicip value, and a privateip value. The seqId value is a sequence number for the static mapping. The sequence number can be per Customer/Account in a given metro and can be assigned incrementally. The publicIp value is an IP address assigned to customer 108. The public IP address is the IP address that network gateway 116 advertises. The privateIp value is a private IP address for customer 108. The private IP address is an IP address used within an autonomous system. Network gateway 112 advertises the public IP address in routing information that defines a path to customer 108. Network gateway 112 forwards network traffic destined for customer 108 to virtual gateway 104, which then forwards the network traffic to customer 108. Thus, in the example illustrated in FIG. 7B, the public IP address is "5.5.5.0" and the private IP address is "10.1.1.2." Thus, other network devices, when desiring to communicate with customer 108 via public network 116, can specify "5.5.5.0" as the destination IP for network packets. Network gateway 116 will be on the advertised path for "5.5.5.0" and thus network packets having a destination address of "5.5.5.0" are routed to network gateway 116. Network gateway forwards such packets to customer 108 via virtual gateway 104 and cloud exchange fabric 102.

Returning to FIG. 2A, in response to the connection request, cloud exchange 120 establishes network connections between customer 108, virtual gateway 104, and network gateway 116 as illustrated in FIG. 1B and FIG. 1C. In some aspects, cloud exchange 120 establishes a Virtual Local Area Network (VLAN) between customer 108 and virtual gateway 104, and a VLAN between virtual gateway 104 and network gateway 116 (222).

As noted above, a colocated customer 108 may have previously created a virtual gateway to route network traffic between customer 108 and one or more cloud service providers via cloud exchange fabric 102 (FIG. 1). Cloud exchange 120 can create a route distinguisher and a route target for the connection between virtual gateway 104 and network gateway 116 and one or more route distinguishers and route targets corresponding to the connections between virtual gateway 104 and one or more cloud service providers 110. The route distinguishes and route targets facilitate correct routing of network traffic from customer 108 to network gateway 116 and from customer 108 to cloud service providers 110. In some aspects, cloud exchange 120 can configure a layer 3 (L3) routing interface (RI) on virtual gateway 104 for the VLAN between virtual gateway 104 and network gateway 116, and an RI for the VLAN between virtual gateway 104 and cloud service providers 110. Each of the RIs, will have their own set of routing tables to ensure that network traffic from colocated customer 108 to virtual gateway is routed appropriately.

In some aspects, a virtual gateway may have a bandwidth limit imposed by cloud exchange 120, where different bandwidth limits may be available at different costs. In the case of a colocated customer 108, the bandwidth limit is shared between the connection to network gateway 116 and the network connection to cloud service providers 110.

Network gateway 112 can use the parameters provided in the API contract 704 to establish a connection to public network 116 for customer 108. For example, network gateway 112 can advertise to other network devices on public network 116 that a route exists to customer 108 via network gateway 112 (224) using a routing protocol such as BGP. At this point, customer 108 has an established connection to public network 116 (226) via virtual gateway 104 (228). Cloud exchange 120 can provide a response to request 220 that the virtual gateway 104 is connected to customer 108 and available for use in communicating network data to and from public network 116 (230).

FIG. 2B is a sequence diagram illustrating example operations for providing secondary network service connections using a virtual gateway, according to techniques described herein. The example operations shown in FIG. 2B are similar to, or the same as, the operations shown in FIG. 2A. In FIG. 2B, operations 204-210 can be performed as part of a primary connection (232) between customer 108 and public network 116. Thus, in primary use operations, 232, customer 108 sends network traffic destined for public network 116 to NSP 106 (204). NSP 106 forwards the network traffic to public network 116 via, for example, a backhaul network (206). Routers on public network 116 send network traffic that is destined for customer 108 is sent to NSP 116 (208). NSP 116 then forwards the network traffic from public network 116 to customer 108 (210).

Operations 216-230 can be performed as part of establishing a redundant connection 234. In this example, customer 108 can establish a redundant connection while primary use 232 operations continue. In other words, redundant connection 234 provides a secondary connection that can be used in addition to, or instead of, the primary use 232 connection. Operations 216-230 can use the same APIs as described above with respect to FIG. 2A and as illustrated in FIGS. 7A and 7B.

Figure 3:
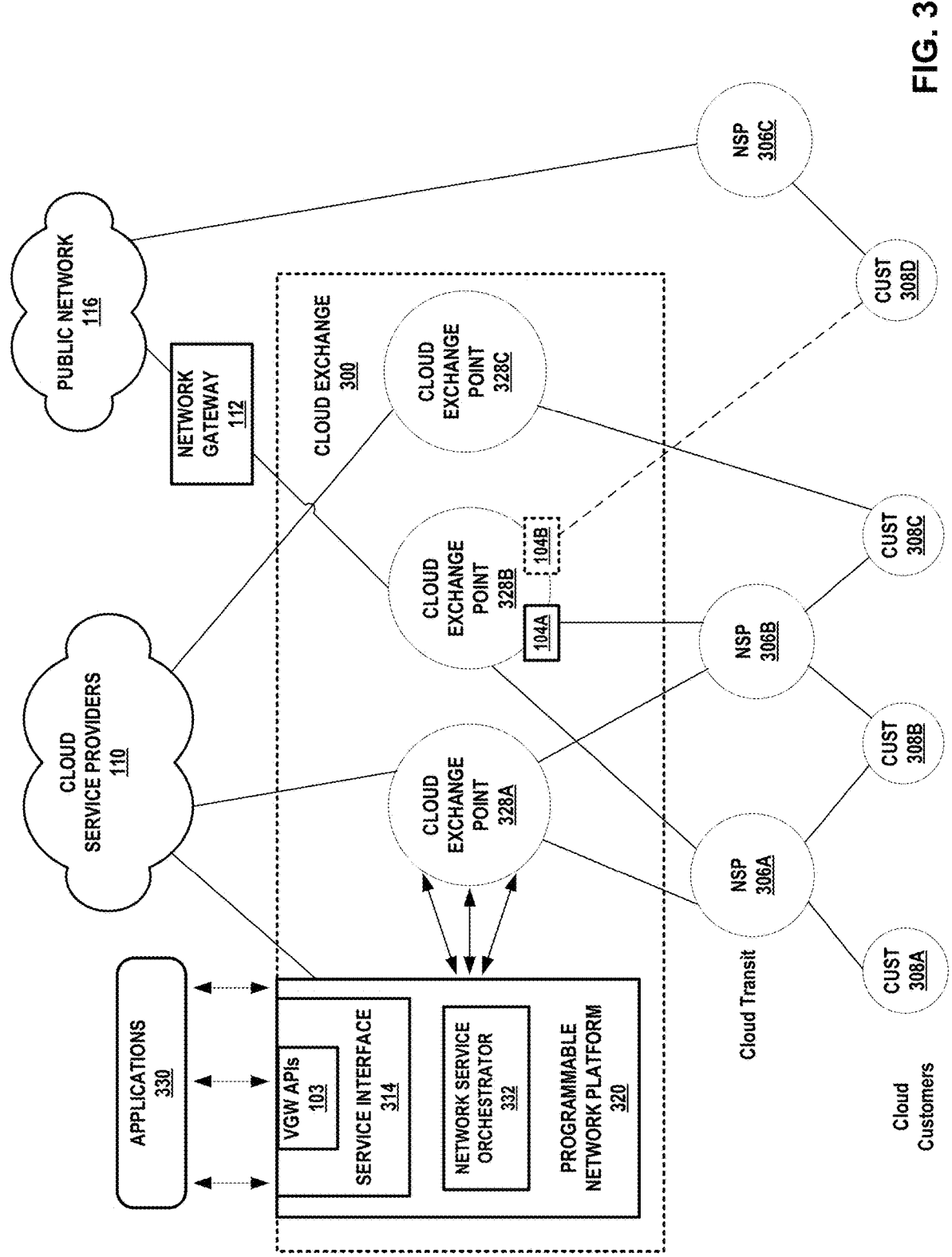
FIG. 3 is a block diagram that illustrates a conceptual view of a network system having a metro-based cloud exchange that provides multiple cloud exchange points for providing fallback services, according to techniques described herein.

FIG. 3 is a block diagram that illustrates a conceptual view of a network system having a metro-based cloud exchange that provides multiple cloud exchange points for providing fallback services, according to techniques described herein. The multiple cloud exchange points may be used to implement, at least in part, a virtual gateway 104. Each of cloud-based services exchange points 328A-328C (described hereinafter as "cloud exchange points" and collectively referred to as "cloud exchange points 328") of cloud-based services exchange 300 ("cloud exchange 300") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("customers") and cloud-based service providers ("cloud providers") connect to receive and provide, respectively, cloud services. In various examples, cloud exchange 300 may include more or fewer cloud exchange points 328. In some instances, a cloud exchange 300 includes just one cloud exchange point 328. As used herein, reference to a "cloud exchange" or "cloud-based services exchange" may refer to a cloud exchange point. Cloud exchange 300 may be the same as cloud exchange 120 of FIGS. 1A, 1B, 2A and 2B. A cloud exchange provider may deploy instances of cloud exchanges 300 in multiple different metropolitan areas, each instance of cloud exchange 300 having one or more cloud exchange points 328.

Each of cloud exchange points 328 includes network infrastructure and an operating environment by which one or more of customers 308A-308C (collectively, "customers 308") receive cloud services from multiple cloud service providers 310A-310N (collectively, "cloud service providers 310"). The cloud service provider 310 may host one of more cloud services 114. As noted above, the cloud service providers 310 may be public or private cloud service providers. In some aspects, a cloud service provider may correspond to one of cloud service providers 110 of FIGS. 1A, 1B, 2A and 2B.

Cloud exchange 300 provides customers of the exchange, e.g., enterprises, network carriers, network service providers, and SaaS customers, with secure, private, virtual connections to multiple cloud service providers (CSPs) globally. The multiple CSPs participate in the cloud exchange by virtue of their having at least one accessible port in the cloud exchange by which a customer may connect to the one or more cloud services offered by the CSPs, respectively. Cloud exchange 300 allows private networks of any customer to be directly cross-connected to any other customer at a common point, thereby allowing direct exchange of network traffic between the networks of the customers.

One or more of customers 308 may receive cloud-based services directly via a layer 3 peering and physical connection to one of cloud exchange points 328 or indirectly via one of NSPs 306A-306B (collectively, "NSPs 306," or alternatively, "carriers 306"). NSPs 306 may be one or more of NSPs 106 of FIGS. 1A, 1B, 2A and 2B. Customers 308 may include customers associated with a virtual gateway 104 as described above. In the example illustrated in FIG. 3, customer 308C is a cloud customer (e.g., a colocated customer) and has used the techniques described herein to create a virtual gateway 104A to connect with cloud service providers 310. Virtual gateway 104A is also available for interconnection with public network 116 via network gateway 112. Customer 308D is a non-colocated customer and uses NSP 306C as primary access to public network 116. NSP 306 may be one of NSPs 106 of FIGS. 1A, 1B, 2A and 2B. NSPs 306A and 306B provide "cloud transit" by maintaining a physical presence within one or more of cloud exchange points 328 and aggregating layer 3 access from one or customers 308. NSPs 306A and 306B may peer, at layer 3, directly with one or more cloud exchange points 328 and in so doing offer indirect layer 3 connectivity and peering to one or more customers 308 by which customers 308 may obtain cloud services from the cloud exchange 300. Each of cloud exchange points 328, in the example of FIG. 3, is assigned a different autonomous system number (ASN). For example, cloud exchange point 328A is assigned ASN 1, cloud exchange point 328B is assigned ASN 2, and so forth. Each cloud exchange point 328 is thus a next hop in a path vector routing protocol (e.g., BGP) path from cloud service providers 310 to customers 308. As a result, each cloud exchange point 328 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 310 to customers. In other words, cloud exchange points 328 may internalize the eBGP peering relationships that cloud service providers 310 and customers 308 would maintain on a pair-wise basis. Instead, a customer 308 may configure a single eBGP peering relationship with a cloud exchange point 328 and receive, via the cloud exchange, multiple cloud services from one or more cloud service providers 310. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 308C is illustrated as having contracted with a cloud exchange provider for cloud exchange 300 to directly access layer 3 cloud services via cloud exchange points 328C. In this way, customer 308C receives redundant layer 3 connectivity to cloud service provider 310A, for instance. Customer 308C also has contracted with NSP 306B to access layer 3 cloud services via a transit network of the NSP 306B. Customer 308B is illustrated as having contracted with multiple NSPs 306A, 306B to have redundant cloud access to cloud exchange points 328A, 328B via respective transit networks of the NSPs 306A, 306B. Additionally, customer 306B has created virtual gateway 104A as a secondary connection to public network 116 via cloud exchange point 328B and network gateway 112. Customer 308A is illustrated as having contracted with NSP 306A to have cloud access to cloud exchange point 328A via transit network of NSP 306A. Customer 308D is illustrated as having contracted with NSP 306C to have access to public network 116. Additionally, customer 308D has contracted with a cloud exchange provider to directly access cloud exchange point 328B as a fallback connection to public network 116. As shown in FIG. 3, customer 308D can create, on-demand, virtual gateway 104B when customer 308D loses access to public network 116 via NSP 306C.

The contracts described above are instantiated in network infrastructure of the cloud exchange points 328 by L3 peering configurations within switching devices of NSPs 306 and cloud exchange points 328 and L3 connections, e.g., layer 3 virtual circuits, established within cloud exchange points 328 to interconnect cloud service provider 310 networks to NSPs 306 networks and customer 308 networks, all having at least one port offering connectivity within one or more of the cloud exchange points 328.

In some examples, cloud exchange 300 allows a corresponding one of customer customers 308A, 308B of any network service providers (NSPs) or "carriers" 306A-306B (collectively, "carriers 306") or other cloud customers including customers 308C to be directly connected, via a virtual layer 2 (L2) or layer 3 (L3) connection to any other customer network and/or to any of CSPs 310, thereby allowing direct exchange of network traffic among the customer networks and CSPs 310. The virtual L2 or L3 connection may be referred to as a "virtual circuit."

Carriers 306 may each represent a network service provider that is associated with a transit network by which network subscribers of the carrier 306 may access cloud services offered by CSPs 310 via the cloud exchange 300. In general, customers of CSPs 310 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 310 via the cloud exchange 300.

In this way, cloud exchange 300 streamlines and simplifies the process of partnering CSPs 310 and customers (via carriers 306 or directly) in a transparent and neutral manner. One example application of cloud exchange 300 is a co-location and interconnection data center in which CSPs 310 and carriers 306 and/or customers 308 may already have network presence, such as by having one or more accessible ports available for interconnection within the data center, which may represent any of cloud exchange points 328. This allows the participating carriers, customers, and CSPs to have a wide range of interconnectivity options within the same facility. A carrier/customer may in this way have options to create many-to-many interconnections with only a one-time hook up to one or more cloud exchange points 328. In other words, instead of having to establish separate connections across transit networks to access different cloud service providers or different cloud services of one or more cloud service providers, cloud exchange 300 allows customers to interconnect to multiple CSPs and cloud services.

Cloud exchange 300 includes a programmable network platform 320 for dynamically programming cloud exchange 300 to responsively and assuredly fulfill service requests that encapsulate business requirements for services provided by cloud exchange 300 and/or cloud service providers 310 coupled to the cloud exchange 300. Programmable network platform 320 may include a network service orchestrator 332 that handles tenant (e.g., cloud client) requests for deployment of virtual gateways 104. For example, network service orchestrator 332 may organize, direct and integrate underlying services through VMs (or containers), as well as other software and network sub-systems, for managing various services (e.g., instantiation of virtual gateways 104). The programmable network platform 320 may, as a result, orchestrate a business-level service across heterogeneous cloud service providers 310 according to well-defined service policies, quality of service policies, service level agreements, and costs, and further according to a service topology for the business-level service.

The programmable network platform 320 enables the cloud service provider that administers the cloud exchange 300 to dynamically configure and manage the cloud exchange 300 to, for instance, facilitate virtual connections for cloud-based services delivery from multiple cloud service providers 310 to one or more cloud customers 308. The cloud exchange 300 may enable customers 308 to bypass the public Internet to directly connect to cloud services providers 310 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

In other examples, programmable network platform 320 enables the cloud service provider to configure cloud exchange 300 with a L3 instance requested by a customer 308, as described herein. A customer 308 may request an L3 instance to link multiple cloud service providers by the L3 instance, for example (e.g., for transferring the customer's data between two cloud service providers, or for obtaining a mesh of services from multiple cloud service providers).

Programmable network platform 320 may represent an application executing within one or more data centers of the cloud exchange 300 or alternatively, off-site at a back office or branch of the cloud provider (for instance). Programmable network platform 320 may be distributed in whole or in part among the data centers, each data center associated with a different cloud exchange point 328 to make up the cloud exchange 300. Although shown as administering a single cloud exchange 300, programmable network platform 320 may control service provisioning for multiple different cloud exchanges. Alternatively or additionally, multiple separate instances of the programmable network platform 320 may control service provisioning for respective multiple different cloud exchanges.

In the illustrated example, programmable network platform 320 includes a service interface (or "service API") 314 that defines the methods, fields, and/or other software primitives by which applications 330, such as a customer portal, may invoke the programmable network platform 320. The service interface 314 may allow carriers 306, customers 308, cloud service providers 310, and/or the cloud exchange provider programmable access to capabilities and assets of the cloud exchange 300 according to techniques described herein.

For example, the service interface 314 may facilitate machine-to-machine communication to enable dynamic provisioning of virtual circuits and virtual gateways 104 in the cloud exchange for interconnecting customer and/or cloud service provider networks. In this way, the programmable network platform 320 enables the automation of aspects of cloud services provisioning. For example, the service interface 314 may provide an automated and seamless way for customers to establish, de-install and manage interconnections among multiple, different cloud providers participating in the cloud exchange. As a further example, service interface 314 may include virtual gateway APIs 103 that provide a way for customers to establish, on-demand, a virtual gateway as a fallback or redundant connection to public network 116.

Further example details of a cloud-based services exchange can be found in U.S. patent application Ser. No. 15/099,407, filed Apr. 14, 2016 and entitled "CLOUD-BASED SERVICES EXCHANGE;" U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and U.S. patent application Ser. No. 14/927,306, filed Oct. 29, 2015 and entitled "ORCHESTRATION ENGINE FOR REAL-TIME CONFIGURATION AND MANAGEMENT OF INTERCONNECTIONS WITHIN A CLOUD-BASED SERVICES EXCHANGE;" each of which are incorporated herein by reference in their respective entireties.

Figure 4:
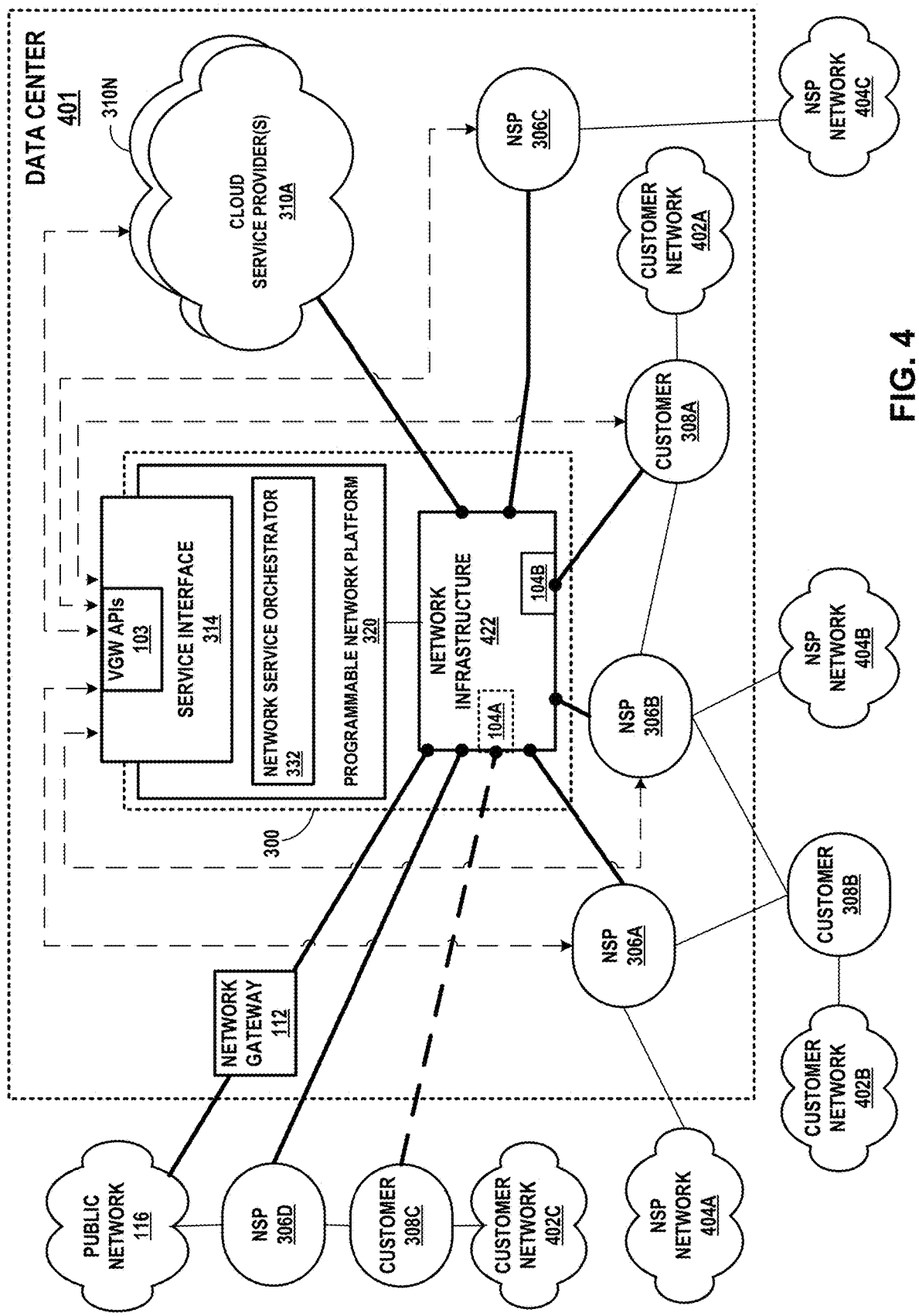
FIG. 4 is a block diagram illustrating an example data center that provides an operating environment providing fallback services, in accordance with one or more aspects of the techniques described in this disclosure.

FIG. 4 is a block diagram illustrating an example data center that provides an operating environment providing fallback services, in accordance with one or more aspects of the techniques described in this disclosure. In this example data center, cloud exchange 300 allows a corresponding one of customer networks 402A-402C and NSP networks 404A-404C (collectively, "'NSP' or 'carrier' networks 404") of any NSPs 306A-306C or other customers to be directly cross-connected, via a layer 2 (L2) or layer 3 (L3) connection to any other customer network, thereby allowing exchange of service traffic among the customer networks, CSPs 310 and public network 116. Data center 401 may be entirely located within a centralized area, such as a warehouse or localized data center complex, and provide power, cabling, security, and other services to NSPs, customers, and cloud service providers that locate their respective networks within the data center 401 (e.g., for colocation) and/or connect to the data center 401 by one or more external links.

Cloud exchange 300 includes network infrastructure 422 and an operating environment by which customer networks 402 may receive services from one or more CSPs 310 via interconnections. In the example of FIG. 4, network infrastructure 422 represents the switching fabric of an interconnection facility of cloud exchange 300 (e.g., cloud exchange fabric 102 of FIG. 1) and includes multiple ports that may be dynamically interconnected with virtual circuits by, e.g., invoking service interface 314 of the programmable network platform 320. Each of the ports is associated with NSPs 306, customers 308, CSPs 310 and public network 116. This enables an NSP customer to have options to create many-to-many interconnections with only a one-time hook up to the switching network and underlying network infrastructure 422 that presents an interconnection platform for cloud exchange 300. In other words, instead of having to establish separate connections across transit networks to access different CSPs 310, cloud exchange 300 allows a customer to interconnect to multiple CSPs 310 using network infrastructure 422 within data center 401.

Additionally, as shown in FIG. 4, customer 308C has an interconnection with public network 116 via NSP 306D. In this example, NSP 306D is located outside of data center 401 and customer 308C is a non-colocated customer. Further, in this example, customer 308A is located within data center 401 and is thus a colocated customer.

An interconnection as described herein may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective network devices (e.g., routers and/or switches) of interconnected customers directly peer and exchange layer 3 routes for service traffic exchanged via network infrastructure 422, and a cloud exchange in which customer routers peer with network infrastructure 422 (or "provider") network devices rather than directly with other customers. Cloud exchange 300 may provide, to customers, interconnection services to network services provided by CSPs 310. That is, an interconnection service by cloud exchange 300 provides access to a network service (e.g., VNF) provided by CSPs 310.

For interconnections at layer 3 or above, customers 308 may receive services directly via a layer 3 peering and physical connection to one of colocation facility exchange points or indirectly via one of NSPs 306. NSPs 306A-306C provide "transit" by maintaining a physical presence within data center 401 and aggregating layer 3 access from one or more customers 308. NSPs 306A-306C may peer, at layer 3, directly with data center 401 and in so doing offer indirect layer 3 connectivity and peering to one or more customers 308 by which customers 308 may obtain services from the cloud exchange 300.

In instances in which cloud exchange 300 offers an internet exchange, network infrastructure 422 may be assigned a different autonomous system number (ASN). Network infrastructure 422 is thus a next hop in a path vector routing protocol (e.g., BGP) path from CSPs 310 to customers 308 and/or NSPs 306. As a result, cloud exchange 300 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more CSPs 310 to customers 308. In other words, cloud exchange 300 may internalize the eBGP peering relationships that CSPs 310 and customers 308 would maintain on a pair-wise basis. Instead, a customer 308 may configure a single eBGP peering relationship with cloud exchange 300 and receive, via the cloud exchange, multiple services from one or more CSPs 310. While described herein primarily with respect to eBGP or other layer 3 routing protocol peering between colocation facility points and customer, NSP, or service provider networks, the colocation facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above for a cloud exchange deployment, customer network 402A in FIG. 4 is illustrated as having contracted with the cloud exchange provider for cloud exchange 300 to directly access layer 3 services via cloud exchange 300 and also to have contracted with NSP 306B to access layer 3 services via a transit network of NSP 306B. Customer network 402A is illustrated as having contracted with NSP 306B to access layer 3 services via a transit network of NSP 306B. The contracts described above may be instantiated in network infrastructure 422 of the cloud exchange 300 by L3 peering configurations within switching devices of NSPs 306 and cloud exchange 300 and L3 connections, e.g., layer 3 virtual circuits, established within cloud exchange 300 to interconnect CSPs 310 to NSPs 306 and customer networks 402, all having at least one port offering connectivity within cloud exchange 300.

In the example illustrated in FIG. 4, non-colocated customer 308C has arranged for primary access to public network 116 through NSP 306D. Additionally, customer 308C has arranged with the cloud exchange provider of cloud exchange 300 to utilize network infrastructure 422 as a fallback service to connect to public network 116 should the connection via NSP 306D fail to be available. In this case, customer 308A can utilize virtual gateway APIs 103 as described above to instantiate a virtual gateway 104 for interconnecting with public network 116 using network infrastructure 422 and network gateway 112. Colocated customer 308A has used the techniques described herein to create a virtual gateway 104B to connect with cloud service providers 310. Virtual gateway 104B is also available to customer 308A for interconnection with public network 116 via network gateway 112.

Further details regarding the example network system of FIG. 3 and example data center 401 of FIG. 4 may be found in U.S. Provisional Patent Application Ser. No. 62/908,976 entitled "VIRTUALIZED NETWORK FUNCTIONS VERIFICATION USING DECENTRALIZED IDENTIFIERS," filed on Oct. 1, 2019, which is hereby incorporated by reference herein.

Figure 5:
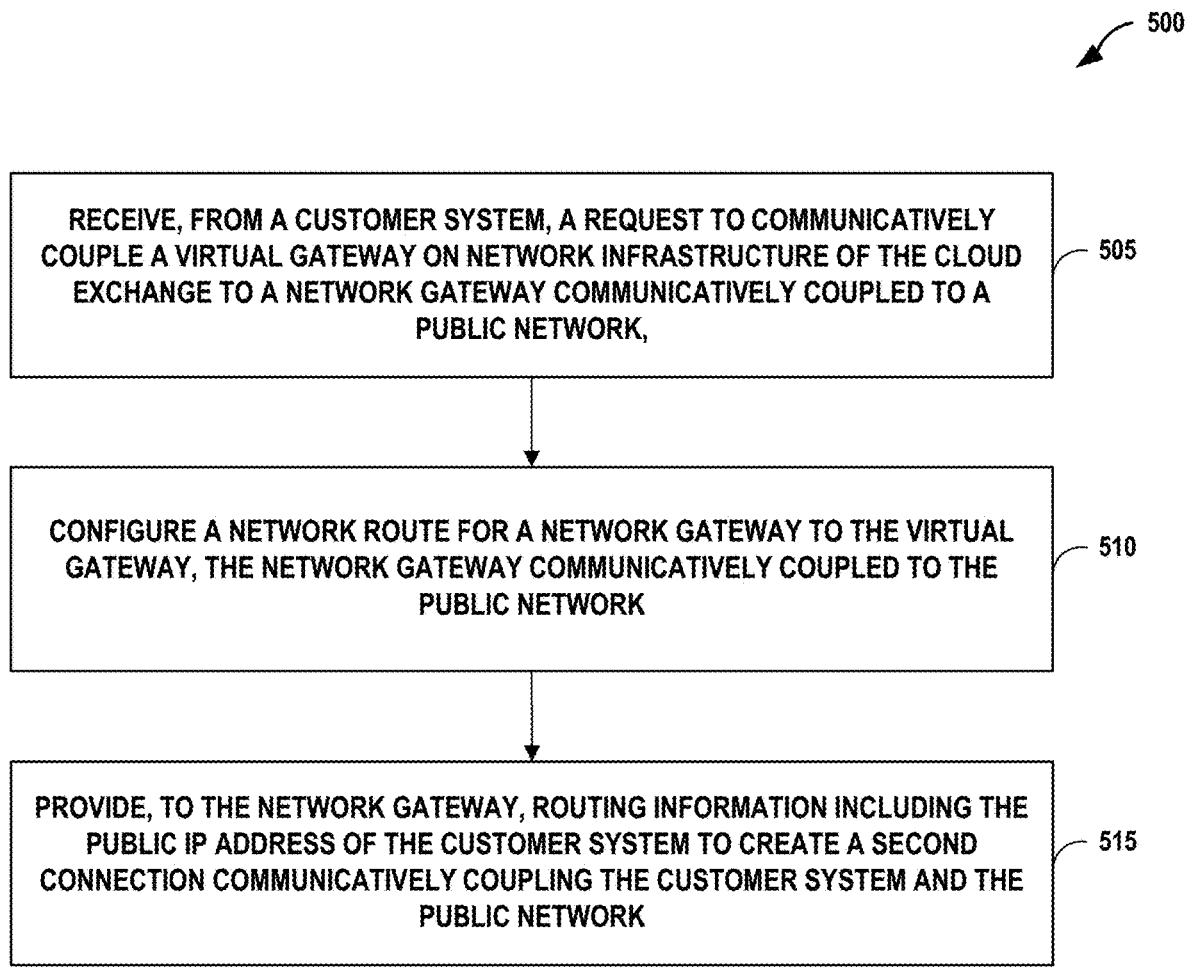
FIG. 5 is a flowchart illustrating operations of a method for providing fallback services for network service providers according to techniques described herein.

FIG. 5 is a flowchart illustrating operations of a method for providing fallback services for network service providers according to techniques described herein. A cloud exchange may receive, from a customer system, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange (505). Next, a cloud exchange may configure a network route for a network gateway to the virtual gateway, the network gateway communicatively coupled to the public network (510). Further, a cloud exchange may, provide, to the network gateway, routing information including the public IP address of the customer system to create a second connection communicatively coupling the customer system and the public network (515).

Figure 6:
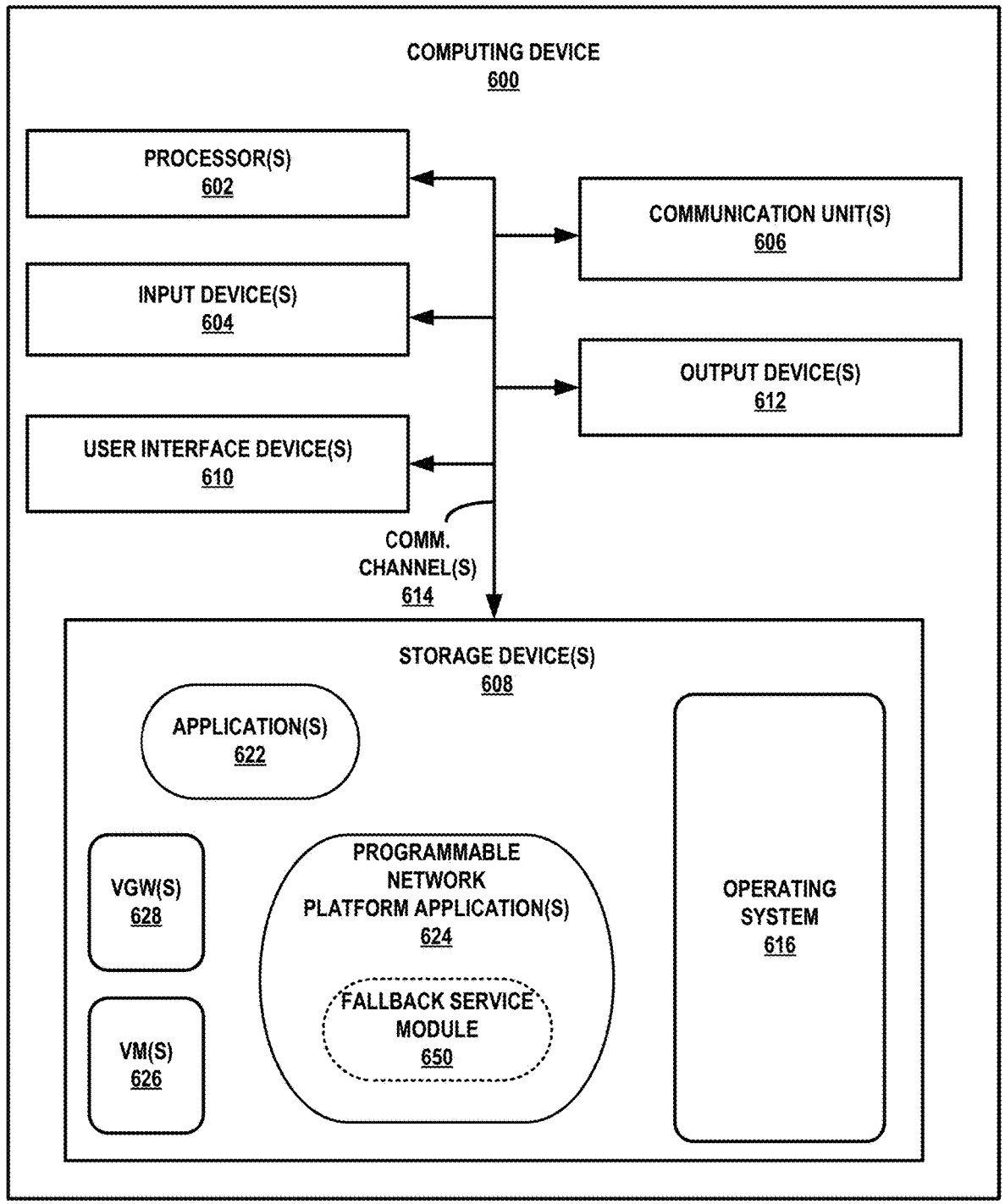
FIG. 6 is a block diagram illustrating further details of one example of a computing device that operates in accordance with one or more techniques of the present disclosure.

FIG. 6 is a block diagram illustrating further details of one example of a computing device that operates in accordance with one or more techniques of the present disclosure. FIG. 6 may illustrate a particular example of a server, network device, or other computing device 600 that includes one or more processor(s) 602 for executing any one or more of any system, application, or module described herein. For example, the one or more processor(s) 602 may execute VMs 626 and virtual gateways 628. Other examples of computing device 600 may be used in other instances. Although shown in FIG. 6 as a stand-alone computing device 600 for purposes of example, a computing device may be any component or system that includes one or more processors or other suitable computing environment for executing software instructions and, for example, need not necessarily include one or more elements shown in FIG. 6 (e.g., communication units 606; and in some examples components such as storage device(s) 608 may not be co-located or in the same chassis as other components).

As shown in the specific example of FIG. 6, computing device 600 includes one or more processors 602, one or more input devices 604, one or more communication units 606, one or more output devices 612, one or more storage devices 608, and user interface (UI) device 610, and communication unit 606. Computing device 600, in one example, further includes one or more applications 622, programmable network platform application(s) 624, and operating system 616 that are executable by computing device 600. Each of components 602, 604, 606, 608, 610, and 612 are coupled (physically, communicatively, and/or operatively) for inter-component communications. In some examples, communication channels 614 may include a system bus, a network connection, an inter-process communication data structure, or any other method for communicating data. As one example, components 602, 604, 606, 608, 610, and 612 may be coupled by one or more communication channels 614.

Processors 602, in one example, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication units 606 to communicate with external devices via one or more networks, such as one or more wired/wireless/mobile networks. Communication units 606 may include a network interface card, such as an Ethernet card, an optical transceiver, a radio frequency transceiver, or any other type of device that can send and receive information. In some examples, computing device 600 uses communication unit 606 to communicate with an external device.

Computing device 600, in one example, also includes one or more user interface devices 610. User interface devices 610, in some examples, are configured to receive input from a user through tactile, audio, or video feedback. Examples of user interface devices(s) 610 include a presence-sensitive display, a mouse, a keyboard, a voice responsive system, video camera, microphone or any other type of device for detecting a command from a user. In some examples, a presence-sensitive display includes a touch-sensitive screen.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user.

Computing device 600 may include operating system 616. Operating system 616, in some examples, controls the operation of components of computing device 600. For example, operating system 616, in one example, facilitates the communication of one or more applications 622, programmable network platform application(s) 624, VMs 626 and virtual gateways 628 with processors 602, communication unit 606, storage device 608, input device 604, user interface devices 610, and output device 612.

Application 622, VMs 626 and virtual gateways 628 may also include program instructions and/or data that are executable by computing device 600. Example programmable network platform application(s) 624 executable by computing device 600 may include fallback service module 650. Fallback service module 650 may expose virtual gateway APIs 103 (FIGS. 1A-1E) and/or handle requests received via virtual gateway APIs 103. Additionally, fallback service module 650 may implement techniques described herein to process requests received via virtual gateway APIs 103 to create virtual gateways 626 and to communicatively couple virtual gateways 628 to network gateways 112 (FIGS. 1B-1E).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   receiving, from a customer system by a cloud exchange comprising processing circuitry, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange, and wherein the customer system is colocated with the cloud exchange;
   configuring, by the cloud exchange, a network route for a network gateway to the virtual gateway, the network gateway communicatively coupled to the public network; and
   providing, by the cloud exchange to the network gateway, routing information including the public IP address of the customer system to create a second connection communicatively coupling the customer system and the public network via the network gateway and the virtual gateway of the cloud exchange.

2. The method of claim 1, further comprising creating, by the cloud exchange, the virtual gateway on the network infrastructure.

3. The method of claim 1, wherein the request to communicatively couple the virtual gateway to the network gateway indicates a failure of the first connection.

4. The method of claim 1, further comprising:
   receiving a request to create the virtual gateway via an Application Program Interface (API) exposed by the cloud exchange prior to receiving the request to communicatively couple the virtual gateway on network infrastructure of the cloud exchange to the network gateway.

5. The method of claim 1, wherein the request to communicatively couple the virtual gateway to the network gateway includes an Autonomous System Number associated with the customer system.

6. The method of claim 1, further comprising:
   determining, by the cloud exchange, a network device of the network infrastructure communicably coupling the customer system with the cloud exchange; and
   creating the virtual gateway on the network device.

7. The method of claim 1, wherein receiving the request to communicatively couple the virtual gateway to the network gateway comprises:
   receiving a first request to create the virtual gateway; and
   receiving a second request to connect the virtual gateway to the network gateway, the second request including the public IP address of the customer system.

8. The method of claim 1,
   wherein the virtual gateway is configured to communicatively couple the customer system with a cloud service provider via a first Virtual Local Area Network (VLAN),
   wherein configuring the network route for the virtual gateway to the network gateway comprises configuring the network route over a second VLAN, and
   wherein the method further comprises:
      receiving by the virtual gateway, network traffic, the network traffic having destination information; and
      routing, by the virtual gateway, the network traffic to one of the network gateway or the cloud service provider based on the destination information.

9. The method of claim 8, wherein the request to communicatively couple the virtual gateway to the network gateway includes a bandwidth parameter specifying a maximum bandwidth for the virtual gateway, wherein the maximum bandwidth is shared by the first VLAN and the second VLAN.

10. The method of claim 1, wherein the first connection comprises a primary connection for the customer system and wherein the second connection comprises a secondary connection for the customer system.

11. A cloud exchange comprising:
   a memory; and
   processing circuitry configured to:
      receive, from a customer system, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange, and wherein the customer system is colocated with the cloud exchange;
      configure a network route for a network gateway to the virtual gateway, the network gateway communicatively coupled to the public network; and
      provide, to the network gateway, routing information including the public IP address of the customer system to create a second connection communicatively coupling the customer system and the public network via the network gateway and the virtual gateway of the cloud exchange.

12. The cloud exchange of claim 11, wherein the processing circuitry is further configured to create the virtual gateway on the network infrastructure.

13. The cloud exchange of claim 11, wherein the request to communicatively couple the virtual gateway to the network gateway indicates a failure of the first connection.

14. The cloud exchange of claim 11, wherein the processing circuitry is further configured to:
receive a request to create the virtual gateway via an Application Program Interface (API) exposed by the cloud exchange prior to receiving the request to communicatively couple the virtual gateway to the network gateway.

15. The cloud exchange of claim 11, wherein the request to communicatively couple the virtual gateway to the network gateway includes an Autonomous System Number associated with the customer system.

16. The cloud exchange of claim 11, wherein the processing circuitry is further configured to:
determine a network device of the network infrastructure communicably coupling the customer system with the cloud exchange; and
create the virtual gateway on the network device.

17. The cloud exchange of claim 11, wherein to receive the request to communicatively couple the virtual gateway to the network gateway comprises:
receive a first request to create the virtual gateway; and
receive a second request to connect the virtual gateway to the network gateway, the second request including the public IP address of the customer system.

18. The cloud exchange of claim 11,
wherein the virtual gateway is configured to communicatively couple the customer system with a cloud service provider via a first Virtual Local Area Network (VLAN),
wherein to configure the network route for the virtual gateway to the network gateway comprises to configure the network route over a second VLAN, and
wherein the virtual gateway is configured to:
receive network traffic, the network traffic having destination information; and
route the network traffic to one of the network gateway or the cloud service provider based on the destination information.

19. The cloud exchange of claim 18, wherein the request to communicatively couple the virtual gateway to the network gateway includes a bandwidth parameter specifying a maximum bandwidth for the virtual gateway, wherein the maximum bandwidth is shared by the first VLAN and the second VLAN.

20. A non-transitory computer-readable storage medium comprising machine executable instructions that, when executed, cause processing circuitry to:
receive, from a customer system, a request to communicatively couple a virtual gateway on network infrastructure of the cloud exchange to a network gateway communicatively coupled to a public network, the request including data indicating a public Internet Protocol (IP) address of the customer system, wherein the customer system is configured with a first connection communicatively coupling the customer system and the public network via a network service provider (NSP) that is separate from the cloud exchange, and wherein the customer system is colocated with the cloud exchange;
configure a network route for a network gateway to the virtual gateway, the network gateway communicatively coupled to the public network; and
provide, to the network gateway, routing information including the public IP address of the customer system to create a second connection communicatively coupling the customer system and the public network via the network gateway and the virtual gateway of the cloud exchange.

* * * * *